(12) United States Patent
Yang et al.

(10) Patent No.: US 11,871,733 B2
(45) Date of Patent: Jan. 16, 2024

(54) DUAL-PURPOSE PORTABLE WATER FOUNTAIN FOR PETS

(71) Applicant: ZHUHAI HENGQIN SUPER TECHNOLOGY LTD., Guangdong (CN)

(72) Inventors: Tianle Yang, Guangdong (CN); Yibao Zeng, Guangdong (CN)

(73) Assignee: ZHUHAI HENGQIN SUPER TECHNOLOGY LTD., Zhuhai (CN)

( * ) Notice: Subject to any disclaimer, the term of this patent is extended or adjusted under 35 U.S.C. 154(b) by 129 days.

(21) Appl. No.: 17/477,529

(22) Filed: Sep. 16, 2021

(65) Prior Publication Data

US 2022/0000069 A1 Jan. 6, 2022

Related U.S. Application Data

(63) Continuation-in-part of application No. PCT/CN2020/084822, filed on Apr. 15, 2020.

(30) Foreign Application Priority Data

May 6, 2019 (CN) .......................... 201920647685.7

(51) Int. Cl.
*A01K 7/02* (2006.01)
(52) U.S. Cl.
CPC .................................... *A01K 7/025* (2013.01)
(58) Field of Classification Search
USPC .......... 119/77, 72, 74, 51.1, 53, 51.12, 51.5, 119/53.5, 54, 56.1
See application file for complete search history.

(56) References Cited

U.S. PATENT DOCUMENTS

| | | | | |
|---|---|---|---|---|
| 153,983 | A * | 8/1874 | Rontey .................. | A45D 42/16 248/471 |
| 286,699 | A * | 10/1883 | Hornberger ............ | F16M 11/00 248/471 |
| 5,636,592 | A * | 6/1997 | Wechsler ................. | A01K 7/06 119/53 |
| 5,960,742 | A * | 10/1999 | O'Rourke ................ | A01K 7/00 222/490 |
| D468,489 | S * | 1/2003 | Wechsler ..................... | D30/132 |

(Continued)

OTHER PUBLICATIONS

International Search Report of PCT Patent Application No. PCT/CN2020/084822 dated Jun. 28, 2020.

*Primary Examiner* — Andrea M Valenti

(57) ABSTRACT

A water fountain for the pets may include a water tray, a water bottle and a bottle cap. The water fountain include two supporting wings, a connecting piece and a hose, the two supporting wings are hinged with two sides of the water tray respectively, a first end of the connecting piece is in connection with the water bottle and in communication with an inner part of the water bottle, a second end of the connecting piece is in connection with the bottle cap and in communication with an inner part of the bottle cap. a first end of the hose is in connection with the bottle cap and in communication with the inner part of the bottle cap, a second end of the hose is arranged inside the water tray. The water fountain not only prevent the water tray from being turned over, but also is convenient to carry.

11 Claims, 4 Drawing Sheets

(56) References Cited

U.S. PATENT DOCUMENTS

| | | | |
|---|---|---|---|
| 8,596,597 B1 * | 12/2013 | Spicer | F16M 11/38 248/81 |
| D701,355 S * | 3/2014 | Yamasaki | D30/132 |
| D705,501 S * | 5/2014 | Li | D30/129 |
| 2008/0087224 A1 * | 4/2008 | Wechsler | A01K 7/00 119/52.1 |
| 2014/0261198 A1 * | 9/2014 | Wechsler | A01K 7/00 119/52.1 |

* cited by examiner

DUAL-PURPOSE PORTABLE WATER FOUNTAIN FOR PETS

CROSS REFERENCE TO RELATED APPLICATIONS

The present application is a Continuation-In-Part Application of PCT Application No. PCT/CN2020/084822 filed on Apr. 15, 2020, which claims the benefit of Chinese Patent Application No. 201920647685.7 filed on May 6, 2019. All the above are hereby incorporated by reference. the contents of which are incorporated herein by reference in their entirety.

TECHNICAL FIELD

The invention relates to the technical field of pet supplies, and in particular to a dual-purpose portable water fountain for pets.

BACKGROUND

Along with the increasing development of the economy, it has become a fashion to keep a pet. In daily life, people pay great attention to the healthy diet of the pet. A vessel, such as a bowl or a plate, is usually taken as a traditional water fountain for the pet. However, the vessel, such as the bowl or the plate, may be easily turned over by the pet, and it is inconvenient to carry the vessel outside. There are some portable water fountains for the pets in the market as well, however, a host generally needs to hold it to water the pet during using, rather than directly puts the portable water fountain on the floor, and thus it is inconvenient for the host.

SUMMARY

An objective of the invention is to provide a dual-purpose portable water fountain for pets. The technical problem to be solved in the invention is: the water fountain for the pets may be held to water the pet, as an alternative, may be put on the floor to water the pet, and it is convenient to carry.

To achieve the above mentioned objective, a dual-purpose portable water fountain for pets provided by the invention may include a water tray, a water bottle and a bottle cap. The water fountain for the pets may further include at least two supporting wings, a connecting piece and a hose. The two supporting wings are hinged with two sides of the water tray respectively, a first end of the connecting piece is in connection with the water bottle and in communication with an inner part of the water bottle, and a second end of the connecting piece is in connection with the bottle cap and in communication with an inner part of the bottle cap. Two rotating shafts are symmetrically arranged outside the connecting piece. The rotating shaft is hinged with a side wall of a first end of the water tray, a first end of the hose is in connection with the bottle cap and in communication with the inner part of the bottle cap, and a second end of the hose is arranged inside the water tray. The water tray is provided with a water groove, and the water bottle may be accommodated inside the water groove.

From the above mentioned solution, through the supporting wings arranged on two sides of the water tray, the water tray may be stably placed on the floor when the supporting wings on the two sides are unfolded, in this way the water tray is prevented from being turned over easily. Through hinging of the water bottle with the water tray, the water tray is provided with the water groove, and the water bottle may be accommodated inside the water groove, in this way the water bottle may be embedded inside the water tray, and it is convenient to carry. Water is controlled to be discharged or not to be discharged by controlling whether the hose is subjected to compression. A water outlet structure is simple, and convenient to operate.

A further solution is: a top of the bottle cap may extrude the hose with the side wall of the water tray.

A further solution is: a peripheral wall of the bottle cap and/or a peripheral wall of the connecting piece may extrude the hose with a groove bottom of the water tray.

A further solution is: the first end of the water tray is provided with multiple first support lugs thereon, the multiple first support lugs are arranged vertically along a height direction of the water tray, each first support lug is provided with a first through hole thereon, and multiple first through holes are coaxially arranged.

A further solution is: a first end of the supporting wing is provided with multiple second support lugs thereon, the multiple second support lugs are arranged vertically along a height direction of the supporting wing, each second support lug is provided with a second through hole, and multiple second through holes are coaxially arranged.

A further solution is: the first support lugs and the second support lugs are arranged at intervals, and the water tray is in moveable connection with the supporting wings through pin shafts going through the second through holes and the first through holes.

A further solution is: a second end of the supporting wing is provided with a pushing hand part, and the pushing hand part is higher than the side wall of the water tray.

A further solution is: the first end of the water tray is provided with a lanyard base thereon, and the lanyard base is provided with a lanyard hole.

REFERENCE NUMBERS

1. Water tray; 2. Supporting wing; 3. Water bottle; 4. Bottle cap; 5. Hose; 6. Connecting piece; 61. Rotating shaft; 62. First step; 63. Buckle; 11. Mounting hole; 12. Water groove; 13. First support lug; 14. First through hole; 15. First stopping part; 16. Arc recess; 17. Lanyard base; 21. Second support lug; 22. Second through hole; 23. Second stopping part; 24. Arc bearing part; 25. Pushing hand part; 41. Second step; 42. Clamping groove; 43. Clamping groove surface; 44. Side wall of water groove; 45. Bottom wall.

The invention will be further described below in connection with drawings and embodiments.

DETAILED DESCRIPTION OF THE EMBODIMENTS

Figure 1:
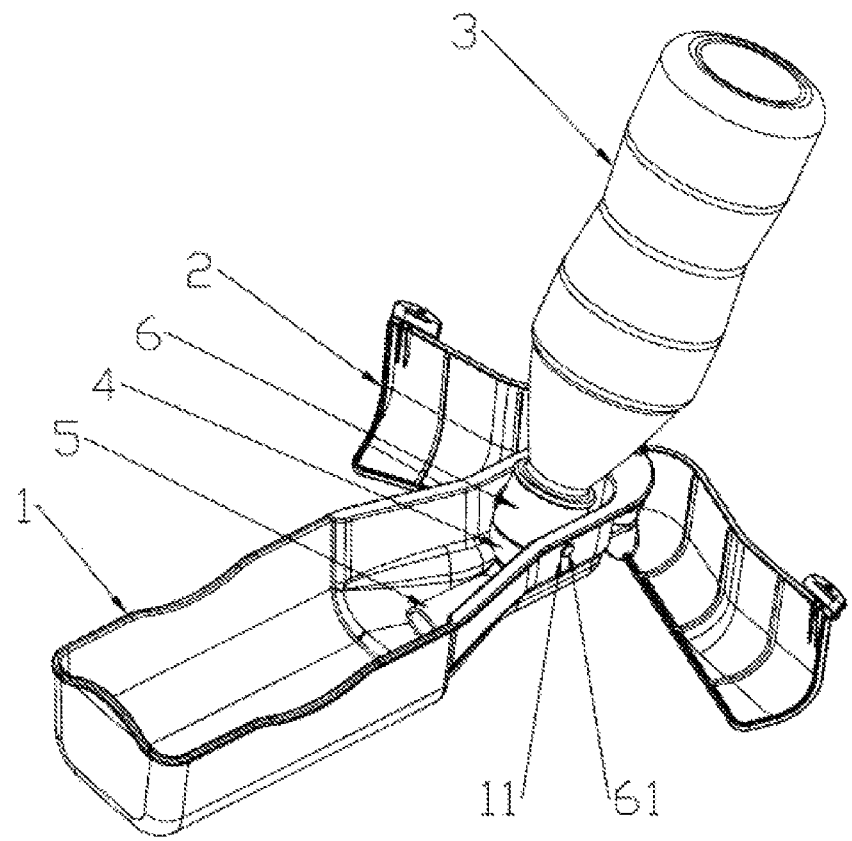
FIG. 1 is a structure diagram of a using status of an embodiment of the invention.
Figure 2:
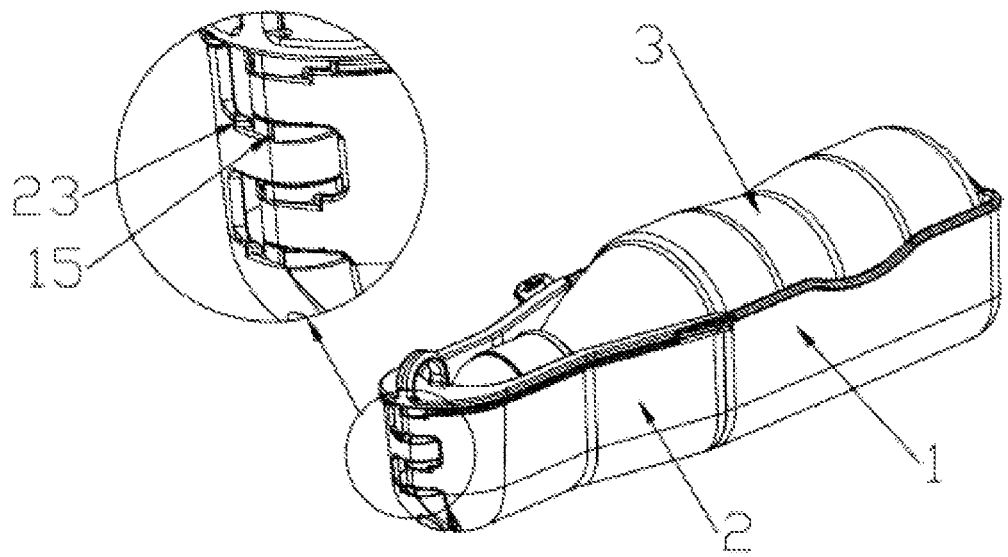
FIG. 2 is a structure diagram of a folded status of an embodiment of the invention.
Figure 3:
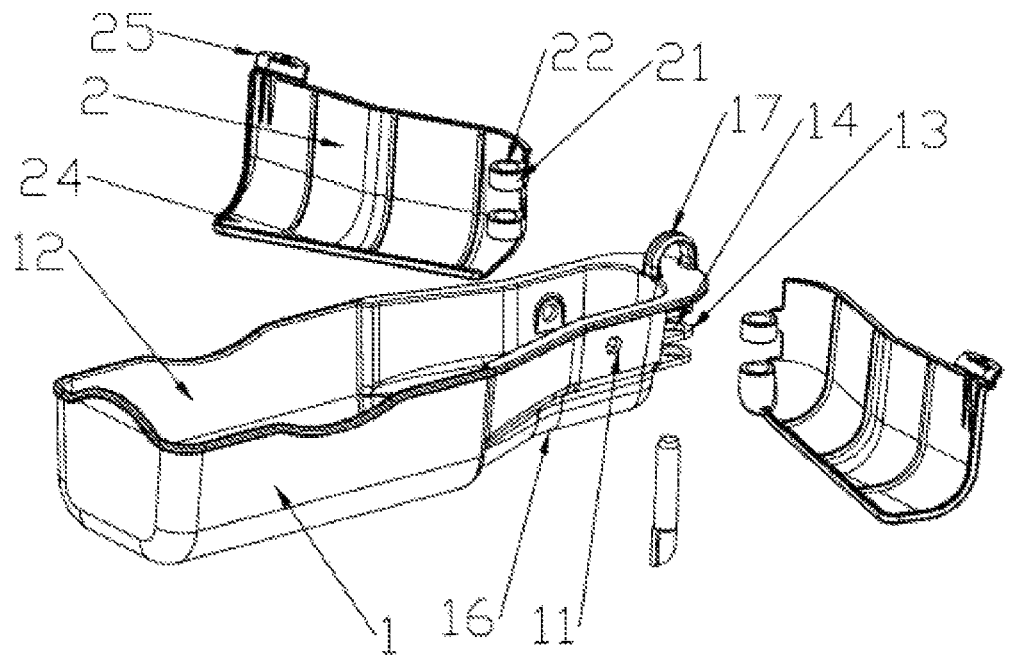
FIG. 3 is a structure decomposition diagram of a water tray and a supporting wing of an embodiment of the invention.
Figure 7:
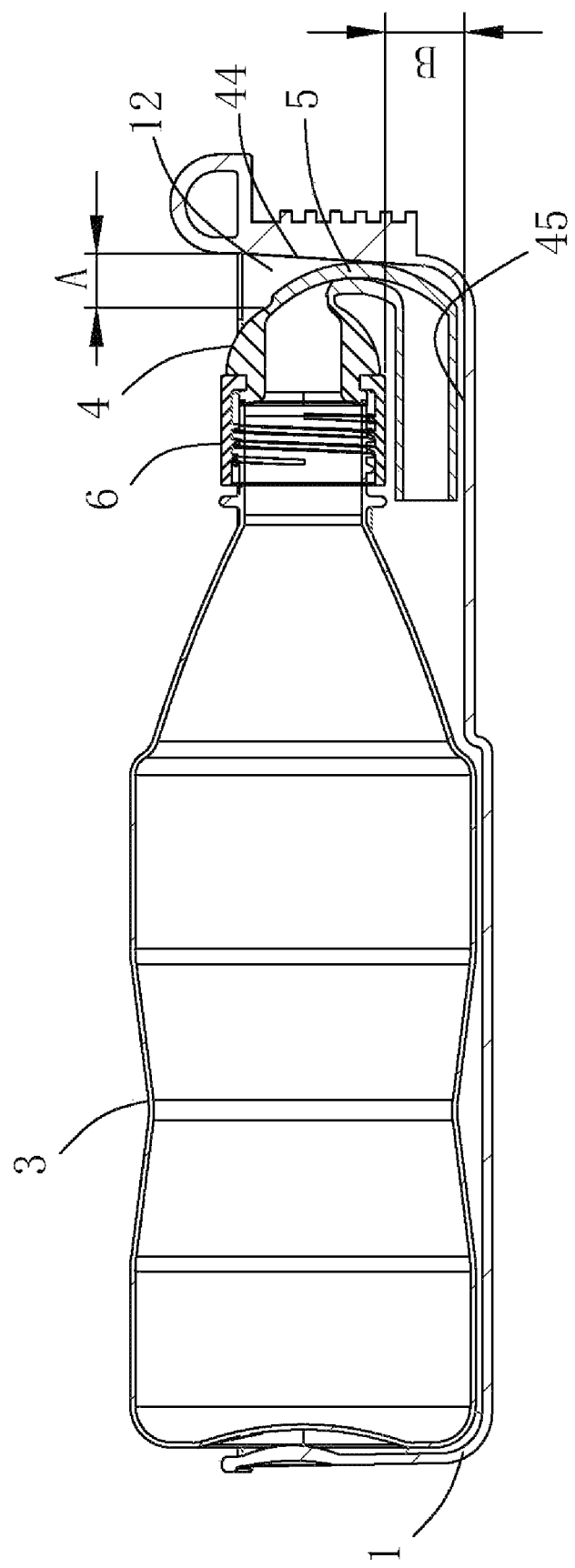
FIG. 7 is a schematic diagram of a position where a hose is subjected to compression.

By referring to FIG. 1-FIG. 2, FIG. 1 is a structure diagram of a using status of an embodiment of the invention, and FIG. 2 is a structure diagram of a folded status of an embodiment of the invention. A water fountain for pets in the embodiment may include a water tray 1, two supporting wings 2, a water bottle 3, a bottle cap 4, a hose 5 and a connecting piece 6. The two supporting wings 2 are hinged with two sides of a first end of the water tray 1 respectively or hinged with two sides of a bottom of the water tray 1. Preferably, the two supporting wings 2 are hinged with the two sides of the first end of the water tray 1 respectively (as shown in FIG. 1 specifically). The supporting wings 2 may be unfolded to two sides. When unfolded, the two supporting wings 2 and the water tray 1 form a triangle supporting structure (please see FIG. 1 for details of the triangle supporting shape), thereby effectively preventing the water fountain for the pets from being turned over. A first end of the connecting piece 6 is in connection with an opening of the water bottle 3 and in communication with an inner part of the water bottle 3, and a second end of the connecting piece 6 is in connection with the bottle cap 4 and in communication with the bottle cap 4. The connecting piece 6 is cylindrical in the embodiment. Two rotating shafts 61 are symmetrically arranged outside the connecting piece 6, and are coaxial. A side wall of the first end of the water tray 1 is provided with two mounting holes 11 thereon. The two rotating shafts 61 correspond to the two mounting holes 11 one by one, and the rotating shaft 61 is inserted into the mounting hole 11. The rotating shaft 61 is in rotating connection with the mounting hole 11, in this way the water bottle 3 may rotate together with the bottle cap 4 by taking the rotating shaft 61 as the center. A first end of the hose 5 is in connection with the bottle cap 4 and in communication with an inner part of the bottle cap 4, and a second end of the hose 5 is arranged inside the water tray 1 and extends to a second end of the water tray 1. FIG. 2-FIG. 3 are structure decomposition diagrams of a water tray and a supporting wing of an embodiment of the invention. The water tray 1 is provided with a water groove 12 therein, and the shape and the size of the water groove 12 fit the water bottle 3, in this way the water bottle 3 may be embedded into the water groove 12, and the water bottle 3 is in clearance fit with the water groove 12. A body of the water bottle 3 is higher than or partially higher than a wall of the water groove 12. When the pet needs water, the water bottle 3 may be erected manually, and at the moment, water inside the water bottle 3 may automatically flow into the water groove 12 of the water tray 1 through the hose 5 in presence of influence of gravity (please see FIG. 1 for details). When the pet does not need the water, the water bottle 3 may be turned down manually and embedded into the water groove 12 of the water tray 1, and at the moment, the hose 5 is extruded due to limitation of an inner space of the water tray 1, in this way an inner part of the hose 5 is not in a communicated status, as to prevent the water inside the water bottle 3 from flowing out (please see FIG. 2 for details). More specifically, a passage A may be formed by a top of the bottle cap 4 and a side wall 44 of the water groove 12 in a separating way. When the water bottle 3 is embedded into the water tray 1, at the moment, the width of the passage A is small. The hose 5 is extruded by the top of the bottle cap 4 with the side wall 44 of the water groove 12, in this way the hose 5 is not in the communicated status (please see FIG. 7 for details), and the water inside the water bottle 3 may not flow out through the hose 5. When the water bottle 3 is erected (please see FIG. 1 for details), the hose 5 may not be extruded by the top of the bottle cap 4 with the side wall 44 of the water groove 12, at the moment, the hose 5 is in the communicated status, and the water inside the water bottle 3 flows out through the hose 5. Or, a passage B may be formed by a peripheral wall of the bottle cap 4, a peripheral wall of the connecting piece 6 and a bottom wall 45 of the water groove 12 in a separating way. When the water bottle 3 is embedded into the water tray 1, at the moment, the width of the passage B is small, and the hose 5 is extruded by the peripheral wall of the bottle cap 4, the peripheral wall of the connecting piece 6 and the bottom wall of the water groove 12, in this way the hose 5 is not in the communicated status. When the water bottle 3 is erected (please see FIG. 1 for details), the hose 5 may not be extruded by the peripheral wall of the bottle cap 4, the peripheral wall of the connecting piece 6 and the bottom wall of the water groove 12, at the moment, the hose 5 is in the communicated status, and the water inside the water bottle 3 flows out through the hose 5.

By referring to FIG. 3, in connection with FIG. 2, FIG. 3 is a structure decomposition diagram of a water tray and a supporting wing of an embodiment of the invention. The first end of the water tray 1 is provided with multiple first support lugs 13, and the multiple first support lugs 13 are arranged vertically along a height direction of the water tray 1. Each first support lug 13 is provided with a first through hole 14 thereon, and multiple first through holes 14 are coaxially arranged. A first end of the supporting wing 2 is provided with multiple second support lugs 21, and the multiple second support lugs 21 are arranged vertically along a height direction of the supporting wing 2. Each second support lug 21 is provided with a second through hole 22 thereon, and multiple second through holes 22 are coaxially arranged. The second support lugs 21 on the supporting wings 2 on the two sides are arranged in a staggered manner along a longitudinal direction. The first support lugs 13 and the second support lugs 21 are arranged at intervals along a longitudinal direction, in this way the first through holes 14 are coaxial with the second through holes 22.

The water tray 1 is in moveable connection with the two supporting wings 2 through pin shafts going through the second through holes 22 and the first through holes 14. The two supporting wings 2 may rotate by taking the pin shaft as the center. The first support lug 13 of the water tray 1 is provided with a first stopping part 15 thereon, and the first stopping part 15 protrudes out along an outer surface of the first support lug 13. The second support lug 21 of the supporting wing 2 is provided with a second stopping part 23, and the second stopping part 23 is arranged on an upper side of the second support lug 21, for abutting against the first stopping part 15, as to control a rotating angle of the supporting wing 2. A lower part of the supporting wing 2 is provided with an arc bearing part 24, and the arc bearing part 24 may be configured to increase a contacting area of the supporting wing 2 and the floor. The bottom of the water tray 1 is provided with an arc recess 16 fitting the arc bearing part 24. When the supporting wings 2 on the two sides are folded, the arc recess 16 is in tight connection with the arc bearing part 24, at the moment, an outer surface of the arc bearing part 24 is aligned with an outer surface of the water tray 1. An upper part of the second end of the supporting wing 2 is provided with a pushing hand part 25, and the pushing hand part 25 extends outwards, upward and slantwise along an upper edge of the supporting wing 2, thereby facilitating unfolding of the supporting wing 2 by applying an external force manually. The first end of the water tray 1 is further provided with a lanyard base 17, and the lanyard base 17 protrudes upward along an upper surface of the water tray 1. The lanyard base 17 is provided with a lanyard hole.

Figure 4:
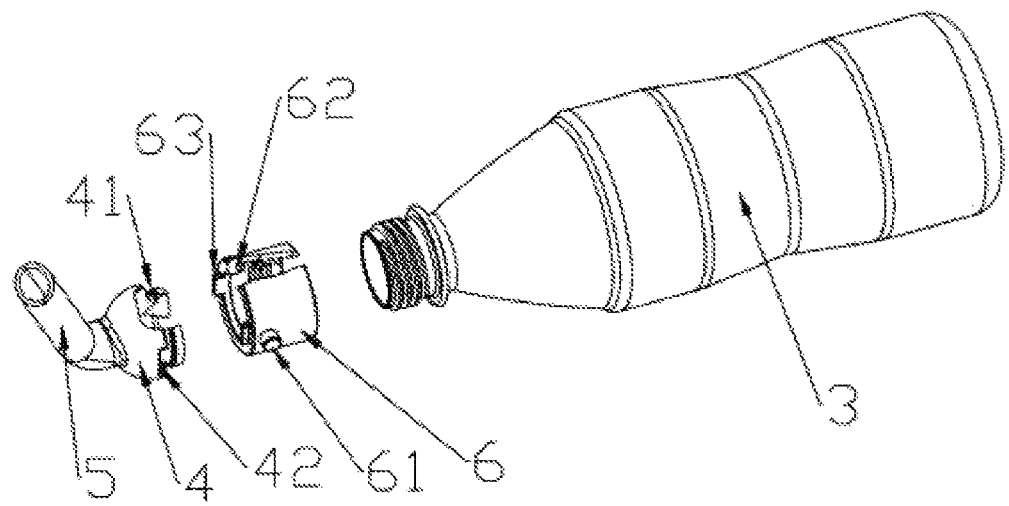
FIG. 4 is a structure decomposition diagram of a water bottle, a connecting piece and a bottle cap of an embodiment of the invention.
Figure 5:
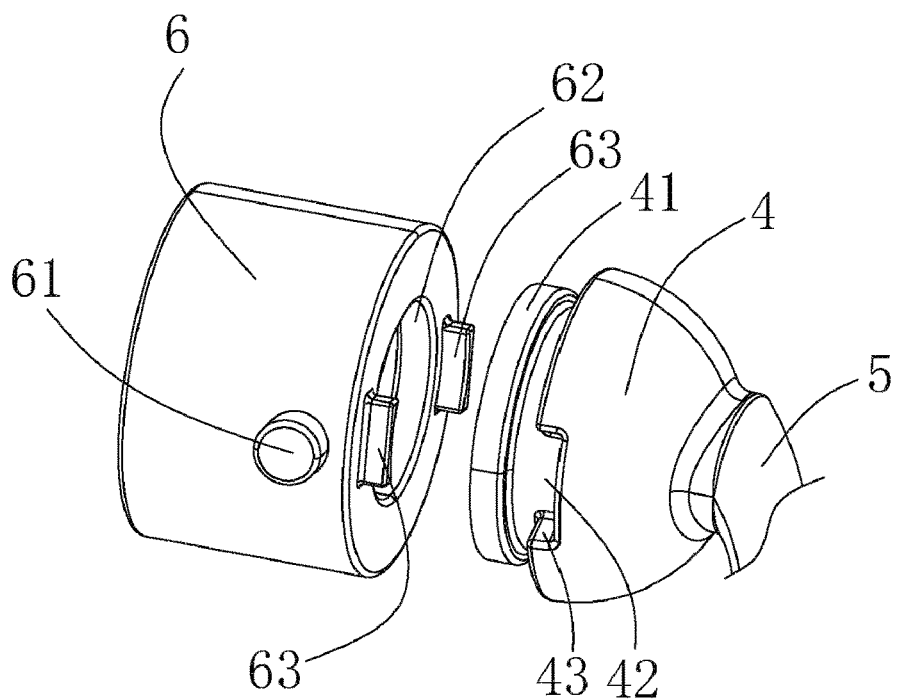
FIG. 5 is a connection relationship diagram of a bottle cap and a connecting piece.
Figure 6:
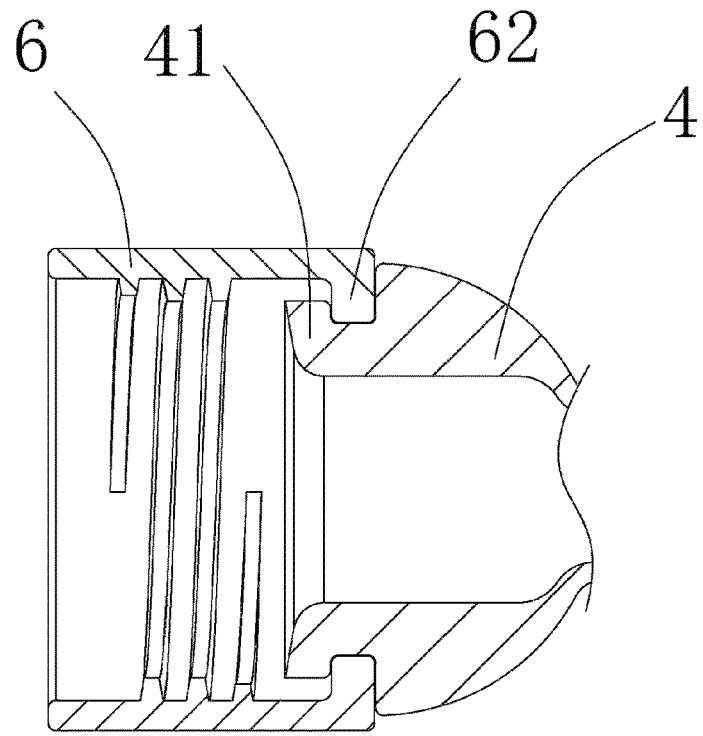
FIG. 6 is a connection relationship section view of a bottle cap and a connecting piece.

By referring to FIG. 4, FIG. 4 is a structure decomposition diagram of a water bottle, a connecting piece and a bottle cap of an embodiment of the invention. The water bottle 3 is a common water bottle, and an outer thread connecting structure is arranged outside an opening of the water bottle. The connecting piece 6 is hollow, a first end is provided with an inner thread connecting structure thereon, and the water bottle 3 is in threaded connection with the connecting piece 6. An inner side of the second end of the connecting piece 6 is provided with a first step 62 (as shown in FIG. 5), and the first step 62 extends toward an axial direction thereof for a preset distance along an inner surface of the connecting piece 6. A first end of the bottle cap 4 is provided with a second step 41 (as shown in FIG. 5), and the first step 62 is in clamped connection with the second step 41 (as shown in FIG. 6), as to prevent the bottle cap 4 from separating from the connecting piece 6. The second end of the connecting piece 6 is symmetrically provided with two buckles 63 (the buckles are cuboid), and the buckles 63 extend axially along an end surface of the second end of the connecting piece 6. The bottle cap 4 is symmetrically provided with two clamping grooves 42 thereon, and the clamping grooves 42 extend axially along the peripheral wall of the bottle cap 4. The two buckles 63 correspond to the clamping grooves 42 one by one, and are inserted into the clamping grooves 42. A clamping groove side of the clamping groove 42 limits the buckle 63 (FIG. 5 shows the clamping groove 42 on one side of the bottle cap 4 only, and the clamping groove 42 on an opposite side is not shown), as to prevent the bottle cap 4 and the connecting piece 6 from rotating oppositely. The second end of the bottle cap 4 is further provided with the hose 5, and an elastic pipe prepared from silica gel or rubber and other materials is taken as the hose 5.

What is claimed is:

1. A dual-purpose portable water fountain for pets, comprising a water tray, a water bottle and a bottle cap, wherein,
the water fountain for the pets further comprises at least two supporting wings, a connecting piece and a hose, the at least two supporting wings are hinged with two sides of the water tray respectively, a first end of the connecting piece is in connection with the water bottle and in communication with an inner part of the water bottle, and a second end of the connecting piece is in connection with the bottle cap and in communication with an inner part of the bottle cap; two rotating shafts are symmetrically arranged outside the connecting piece, the rotating shaft is hinged with a side wall of a first end of the water tray, a first end of the hose is in connection with the bottle cap and in communication with the inner part of the bottle cap, and a second end of the hose is arranged inside the water tray; and
the water tray is provided with a water groove, and the water bottle is accommodated inside the water groove; and
wherein each of the at least two supporting wings is provided with an arc bearing part, which is configured to increase a contacting area of the at least two supporting wings and floor;
a bottom of the water tray is provided with an arc recess fitting the arc bearing part; and
under the condition that the at least two supporting wings are folded, the arc recess is in tight connection with the arc bearing part, and an outer surface of the arc bearing part is aligned with an outer surface of the water tray.

2. The water fountain for pets as claimed in claim 1, wherein,
a top of the bottle cap is able to extrude the hose with the side wall of the water tray.

3. The water fountain for pets as claimed in claim 1, wherein,
a peripheral wall of the bottle cap and/or a peripheral wall of the connecting piece is able to extrude the hose with a groove bottom of the water tray.

4. The water fountain for pets as claimed in claim 1, wherein,
the first end of the water tray is provided with multiple first support lugs thereon, the multiple first support lugs are arranged vertically along a height direction of the water tray, each first support lug is provided with a first through hole, and multiple first through holes are coaxially arranged.

5. The water fountain for pets as claimed in claim 4, wherein,
a second end of the supporting wing is provided with a pushing hand part, and the pushing hand part is higher than the side wall of the water tray.

6. The water fountain for pets as claimed in claim 4, wherein,
a first end of the supporting wing is provided with multiple second support lugs thereon, the multiple second support lugs are arranged vertically along a height direction of the supporting wing, each second support lug is provided with a second through hole, and multiple second through holes are coaxially arranged.

7. The water fountain for pets as claimed in claim 6, wherein,
a second end of the supporting wing is provided with a pushing hand part, and the pushing hand part is higher than the side wall of the water tray.

8. The water fountain for pets as claimed in claim 6, wherein,
the first support lugs and the second support lugs are arranged at intervals, and the water tray is in moveable connection with the at least two supporting wings through pin shafts going through the second through holes and the first through holes.

9. The water fountain for pets as claimed in claim 8, wherein,
a second end of the supporting wing is provided with a pushing hand part, and the pushing hand part is higher than the side wall of the water tray.

10. The water fountain for pets as claimed in claim 1, wherein,
the first end of the water tray is provided with a lanyard base thereon, and the lanyard base is provided with a lanyard hole.

11. A dual-purpose portable water fountain for pets, comprising a water tray, a water bottle and a bottle cap, wherein,
the water fountain for the pets further comprises at least two supporting wings, a connecting piece and a hose, the at least two supporting wings are hinged with two sides of the water tray respectively, a first end of the connecting piece is in connection with the water bottle and in communication with an inner part of the water bottle, and a second end of the connecting piece is in connection with the bottle cap and in communication with an inner part of the bottle cap; two rotating shafts are symmetrically arranged outside the connecting piece, the rotating shaft is hinged with a side wall of a first end of the water tray, a first end of the hose is in connection with the bottle cap and in communication with the inner part of the bottle cap, and a second end of the hose is arranged inside the water tray; and the water tray is provided with a water groove, and the water bottle is accommodated inside the water groove; and the hose is configured such that water inside the water bottle automatically flow into the water groove of the water tray through the hose in presence of influence of gravity under the condition that the water bottle is erected manually, and such that the hose is extruded and not in a communicated status under the condition the water bottle is turned down manually and embedded into the water groove of the water tray, as to prevent the water inside the water bottle from flowing out.

\* \* \* \* \*